E. B. NATHAN.
TIRE CASING.
APPLICATION FILED OCT. 3, 1910.
1,042,026.
Patented Oct. 22, 1912.
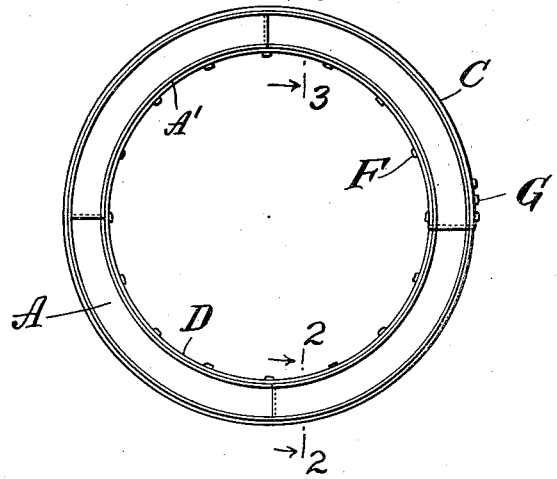
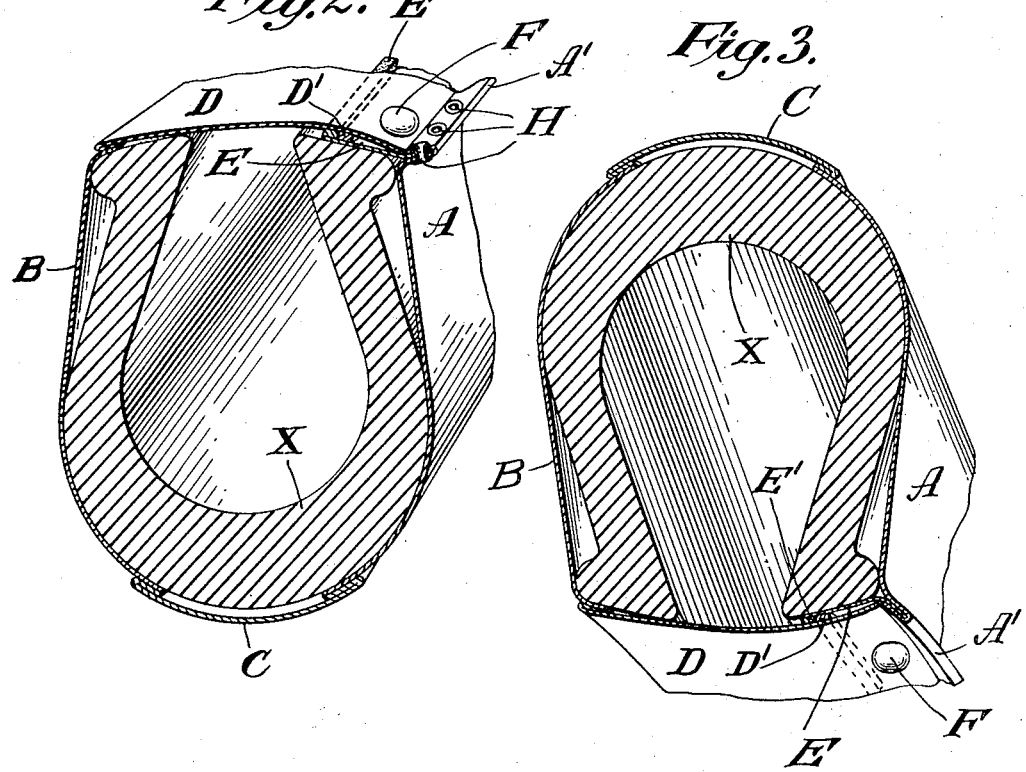
Witnesses:
Edna R. Moreland
Alan C. McDonnell
Edwin B. Nathan Inventor
By William R. Baird
his attorney

UNITED STATES PATENT OFFICE.

EDWIN B. NATHAN, OF NEW YORK, N. Y.

TIRE-CASING.

1,042,026.   Specification of Letters Patent.   Patented Oct. 22, 1912.

Application filed October 3, 1910. Serial No. 585,051.

*To all whom it may concern:*

Be it known that I, EDWIN B. NATHAN, a citizen of the United States, residing at the borough of Manhattan, in the county of New York, city and State of New York, have invented certain new and useful Improvements in Tire-Casings, of which the following is a specification.

My invention relates to covers or cases for pneumatic tires or the shoes for said tires, and its objects are, among others, to provide a cover or casing of this character of simple, strong and durable construction which will inclose and cover the tire or shoe and protect it from all conditions of weather and which will permit the tire to be inserted therein or removed therefrom quickly and without unnecessary labor or injury to the tire or cover.

The invention consists in the construction, combination and arrangement of parts hereinafter described and claimed and illustrated in the accompanying drawings.

In the said drawings Figure 1 is a side elevation of a tire case or cover embodying the improvements. Fig. 2 is a vertical section on the line 2—2 of Fig. 1 looking in the direction indicated by the arrow. Fig. 3 is a like section on the line 3—3 of Fig. 1 looking in the direction indicated by the arrow.

The casing is made of suitable waterproof flexible material and consists of a side strip A, composed of four arc-shaped sections secured together at their ends, a similar reverse side strip B, an outside strip C covering the tread of the tire, and an inside strip D.

The inner edge A′ of the strip A extends beyond the adjacent edge of the part D throughout the entire inner circumference of the casing and is folded back upon itself. Within this fold the outer edge of the flap E is held (preferably by means of stitches passing through the part A and the side flap) and its inner edge which rests upon the shoe X of the tire is provided with a strip E′ of felt, hemp or other absorbent material coöperating with the abutting parallel strip D′ on the underside of the strip D to form a moisture absorbing closure.

The circumferential edges of the case are secured together by snap fasteners F, one member of which is carried by the edge of the part D and the other by the flap E so that the said edges are secured together outside of the absorbent strips D′, E′. The ends of the case are secured by means of similar fasteners G.

It will be understood that it is very desirable to prevent moisture from entering the case and causing deterioration of the tire inclosed therein, and yet these casings are frequently exposed to the heaviest rains and occasionally washed with a jet from a hose. It will be apparent, therefore that the utmost precaution must be provided in the construction of such a casing against the entrance of water under all conditions of use. The joints of the pieces of material forming the casing are, therefore, carefully closed, and all overlapping parts pointed downward so as to shed water. It is also customary to provide cases of this character with means for securing the detachable edges in such a manner that rain or casual water will not ordinarily penetrate the joint. So far as I am aware, however, all of these means are faulty and will not prevent water from heavy rains or careless washing from seeping and accumulating to a greater or less extent inside the casing; and the principal object of the present improvements is to render the casing secure against this.

It will be seen that the extension or flange A′ overlaps the edge of the part D so that water whether directed against the joint from above or laterally will strike this flange and be deflected therefrom. If by any chance a small amount of water should pass between the edge of the part D and the flange A′, however, it will drip out, or run down to the bottom of the tire cover along the base of the said flange, and would accumulate there were it not for the outlet openings H provided in the said flange at the bottom of the cover or casing. These openings consist of a plurality of eyelets extending through the flange A′ and the edge of the flap E within its fold and provide a drain or outlet for the entire joint of the casing from top to bottom so that no matter where the water enters it will find its way down to and escape through these outlets. The flange at the upper part of the tire is not provided with openings (see Fig. 3) as at that part of the cover they might merely tend to permit water to enter the joint but the lower part of the casing is provided with a sufficient number of said outlet openings to permit any water that may accumulate in the gutter formed by the flange A' or in the joint of the parts D and E to escape therethrough.

What I claim is:—

1. In a device of the character set forth, a flexible casing having a longitudinal joint, one wall of said casing having its margin at the joint doubled and forming an outstanding shield for said joint, an inwardly extending flap having one margin inclosed within the doubled portion, the other wall of the casing having its free margin overlapping the flap, means for detachably securing said overlapping portions together, and ribs of absorbent material carried respectively by the overlapping portions, said ribs detachably interengaging and preventing lateral displacement of said portions.

2. In a device of the character set forth, a flexible casing having a longitudinal joint, one wall of said casing having its margins at the joint doubled and forming an outstanding shield for said joint, an inwardly extending flap having one margin inclosed within the doubled portion, the other wall of the casing having its free margin overlapping the flap, means for detachably securing said overlapping portions together, ribs of absorbent material carried respectively by the overlapping portions, said ribs detachably interengaging and preventing lateral displacement of the said portions, and devices interposed between the ribs and shield for detachably securing the overlapped margin of the wall and the flap together.

In testimony whereof I have affixed my signature in presence of two witnesses.

EDWIN B. NATHAN.

Witnesses:
E. W. SCHERR, Jr.,
ALAN C. McDONNELL.